US012798585B2

(12) United States Patent
Pramod et al.

(10) Patent No.: US 12,798,585 B2
(45) Date of Patent: Nov. 17, 2026

(54) SYSTEM AND METHOD FOR CONTROLLING POWERTRAIN FOR REDUCING POWER LOSS OF TRACTION MOTOR IN VEHICLE

(71) Applicant: Mahindra & Mahindra Limited, Chengalpattu (IN)

(72) Inventors: Singh Pramod, Chengalpattu (IN); Natarajan Saravanan, Chengalpattu (IN); Arumugham Sivakumar, Chengalpattu (IN); Abbaas Mohd Ali, Chengalpattu (IN); Sundaram Pavithra, Chengalpattu (IN)

(73) Assignee: Mahindra & Mahindra Limited, Chengalpattu (IN)

( * ) Notice: Subject to any disclaimer, the term of this patent is extended or adjusted under 35 U.S.C. 154(b) by 198 days.

(21) Appl. No.: 18/367,091

(22) Filed: Sep. 12, 2023

(65) Prior Publication Data

US 2024/0409099 A1 Dec. 12, 2024

(30) Foreign Application Priority Data

Jun. 8, 2023 (IN) ............................ 202341039170

(51) Int. Cl.
*B60W 30/188* (2012.01)
*B60L 15/20* (2006.01)
(Continued)

(52) U.S. Cl.
CPC ....... *B60W 30/188* (2013.01); *B60L 15/2045* (2013.01); *B60W 10/08* (2013.01);
(Continued)

(58) Field of Classification Search
CPC .. B60W 30/188; B60W 10/08; B60W 10/103; B60W 2510/081; B60W 2510/083; B60W 2520/00; B60W 2710/081; B60W 2710/083; B60W 2710/1038; B60W 2710/105; B60L 15/2045; B60L 2240/12;
(Continued)

(56) References Cited

U.S. PATENT DOCUMENTS

2016/0280222 A1* 9/2016 Ono .................... B60W 30/025
2023/0303214 A1* 9/2023 Connors ................ B60L 15/20
(Continued)

*Primary Examiner* — Hitesh Patel
*Assistant Examiner* — Ashleigh Nicole Turnbaugh
(74) *Attorney, Agent, or Firm* — Amster, Rothstein & Ebenstein LLP

(57) ABSTRACT

The disclosure herein generally relates to vehicle control systems and more particularly, to a system and a method for controlling a powertrain for reducing power loss of a traction motor in the vehicle such as but not limited to an electric vehicle. The system (100) includes a main controller unit (102), a vehicle speed sensor (104), a throttle sensor (106), a control switch (108), a motor speed sensor (10S), a traction motor controller (10TMC) and a transmission controller unit (10TCU). The system optimizes the operating zone of the traction motor (10TM) for achieving better efficiency of the traction motor (10TM). The system reduces power consumption required for cooling battery and powertrain components of the vehicle due to less heat generation achieved by operating the traction motor (10TM) in higher efficiency zone.

10 Claims, 2 Drawing Sheets

(51) Int. Cl.

| | |
|---|---|
| ***B60W 10/08*** | (2006.01) |
| ***B60W 10/103*** | (2012.01) |
| ***F16H 59/24*** | (2006.01) |
| ***F16H 59/36*** | (2006.01) |
| ***F16H 59/44*** | (2006.01) |
| ***F16H 59/74*** | (2006.01) |
| ***F16H 61/462*** | (2010.01) |

(52) U.S. Cl.
CPC ........... *B60W 10/103* (2013.01); *F16H 59/24* (2013.01); *F16H 59/44* (2013.01); *F16H 59/74* (2013.01); *F16H 61/462* (2013.01); *B60L 2240/12* (2013.01); *B60L 2240/421* (2013.01); *B60L 2240/423* (2013.01); *B60W 2510/081* (2013.01); *B60W 2510/083* (2013.01); *B60W 2520/00* (2013.01); *B60W 2710/081* (2013.01); *B60W 2710/083* (2013.01); *B60W 2710/1038* (2013.01); *B60W 2710/105* (2013.01); *F16H 2059/366* (2013.01)

(58) Field of Classification Search
CPC ......... B60L 2240/421; B60L 2240/423; F16H 59/24; F16H 59/44; F16H 59/74; F16H 61/462; F16H 2059/366
USPC ........................................................... 701/22
See application file for complete search history.

(56) References Cited

U.S. PATENT DOCUMENTS

| | | | | |
|---|---|---|---|---|
| 2024/0109423 | A1* | 4/2024 | Sujan | B60L 7/18 |
| 2024/0263687 | A1* | 8/2024 | Boulet | B60W 30/19 |

* cited by examiner

SYSTEM AND METHOD FOR CONTROLLING POWERTRAIN FOR REDUCING POWER LOSS OF TRACTION MOTOR IN VEHICLE

TECHNICAL FIELD

The embodiments herein generally relate to vehicle control systems and more particularly, to a system and a method for controlling a powertrain for reducing power loss of a traction motor in the vehicle such as but not limited to an electric vehicle.

BACKGROUND

In electric vehicles, traction motors have a larger power band compared to internal combustion engines. Traction motors deliver the same power at multiple combinations of speed and torque. Though traction motors can be operated at various combinations of speed and torque to deliver the same power, the efficiency of the traction motor varies based on various vehicle operating conditions such as throttle and gear ratios. Controlling the speed and torque of the traction motor at various vehicle operating conditions to deliver the required speed and torque at a drive axle of the vehicle as well as achieving higher efficiency of the traction motor is difficult and is one of the challenges posed to original equipment manufacturers (OEMs).

Therefore, there exists a need for a system and a method for controlling a powertrain for reducing power loss of a traction motor, which obviates the aforementioned drawbacks.

OBJECTS

The principal object of embodiments herein is to provide a system for controlling a powertrain for reducing power loss of a traction motor in a vehicle such as but not limited to an electric vehicle.

Another object of embodiments herein is to provide a method for controlling the powertrain for reducing power loss of the traction motor in the electric vehicle.

Another object of embodiments herein is to optimize the operating zone of the traction motor for achieving better efficiency of the traction motor.

Another object of embodiments herein is to reduce power consumption required for cooling battery and powertrain components of the vehicle due to less heat generation achieved by operating the traction motor in higher efficiency zone.

Another object of embodiments herein is to provide the system which varies hydro-static transmission (HST) ratio to operate the traction motor in higher efficiency zone as well as to increase vehicle range.

Another object of embodiments herein is to provide the system which minimizes power consumed by the traction motor thereby increasing the vehicle range and thermal performance.

These and other objects of embodiments herein will be better appreciated and understood when considered in conjunction with following description and accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments are illustrated in the accompanying drawings, throughout which like reference letters indicate corresponding parts in various figures. The embodiments herein will be better understood from the following description with reference to the drawings, in which.

DETAILED DESCRIPTION

Figure 1:
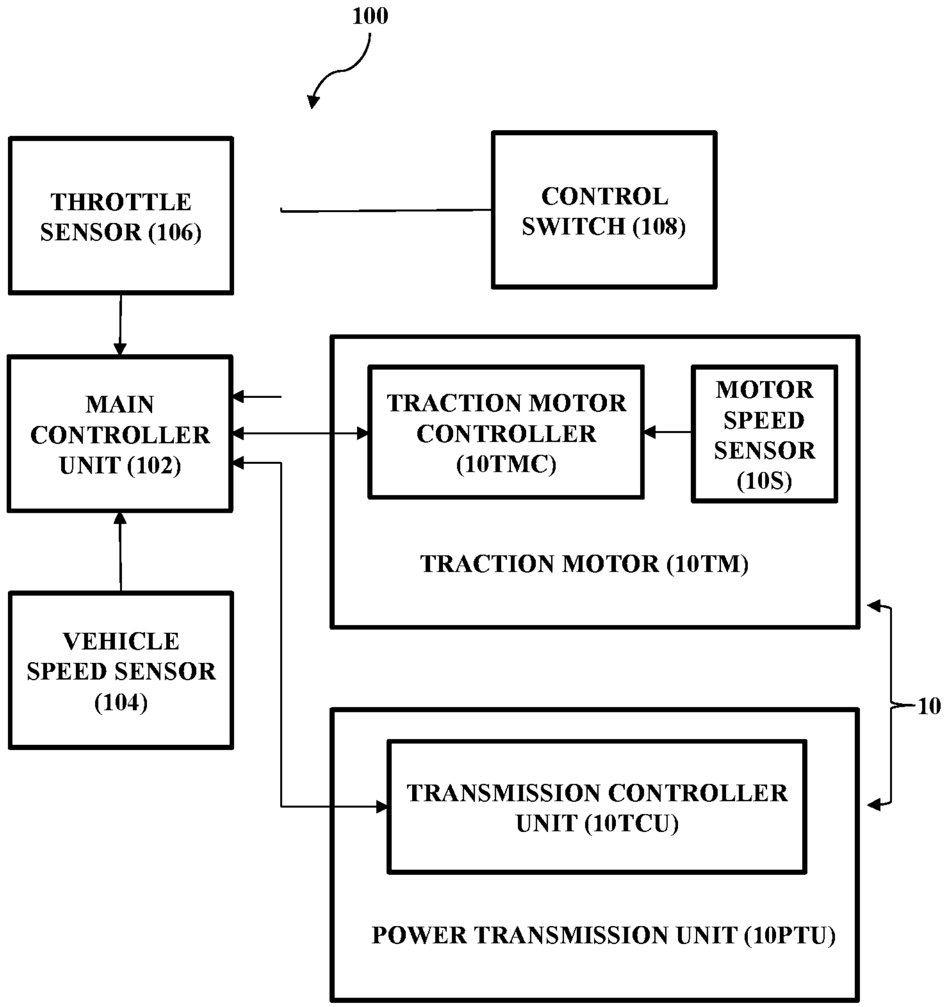
FIG. 1 depicts a block diagram of a system for controlling a powertrain for reducing power loss of a traction motor in a vehicle, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a system and a method for controlling powertrain for reducing power loss of a traction motor in a vehicle. Referring now to the FIG. 1 and FIG. 2, where similar reference characters denote corresponding features consistently throughout the figures, there are shown embodiments.

FIG. 1 depicts a block diagram of a system (100) for controlling a powertrain (10) for reducing power loss of a traction motor (10TM) in a vehicle, according to embodiments as disclosed herein. In an embodiment, the system (100) includes a main controller unit (102), a vehicle speed sensor (104), a throttle sensor (106), a control switch (108), a motor speed sensor (10S), a traction motor controller (10TMC) and a transmission controller unit (10TCU). For the purpose of this description and ease of understanding, the system (100) is explained herein with below reference to controlling the powertrain (10) having a hydro-static transmission unit for reducing power loss of the traction motor (10TM) in an electric vehicle. However, it is also within the scope of the invention to use/practice the components of the system (100) in combination with the logic method steps executed by the main controller unit (102) for controlling the powertrain (10) having any other continuously variable transmission (CVT) or any other infinitely variable transmission (IVT) or any other automatic power transmission unit present in any other agricultural machines or any other off-road vehicles or hybrid vehicles or any other vehicles or industrial machines, where reducing power loss of traction motor or drive motor or propulsion motor is required, without otherwise deterring the intended function of the system (100) as can be deduced from the description and corresponding drawings.

The power train (10) includes the traction motor (10TM) and a power transmission unit (10PTU). The main controller unit (102) is configured to control the powertrain (10) for reducing power loss of the traction motor (10TM). The main controller unit (102) is in communication with the vehicle speed sensor (104), the throttle sensor (106), the control switch (108), the traction motor controller (10TMC) and the transmission controller unit (10TCU). For example, the throttle sensor (106), the control switch (108), the traction motor controller (10TMC) and the transmission controller unit (10TCU) can communicate with the main controller unit (102) using a controller area network (CAN). It is also within the scope of the invention to use any other wired communicators or any other wireless communicators for communication by the throttle sensor (106), the control switch (108), the traction motor controller (10TMC) and the transmission controller unit (10TCU) with the main controller unit (102). The main controller unit (102) is configured to read data from the vehicle speed sensor (104), data from the throttle sensor (106) and data from the motor speed sensor (10S). The traction motor controller (10TMC) sends actual speed and torque of the traction motor (10TM) to the main controller unit (102). The main controller unit (102) is configured to determine actual operating efficiency of the traction motor (10) by comparing actual torque and speed of the traction motor (10TM) against predefined data provided in at least one lookup table (T1). For the purpose of this description and ease of understanding, the lookup table (T1) is stored in a memory unit of the main controller unit (102). The predefined data provided in the lookup table (T1) includes torque of drive axle, speed of drive axle, torque of traction motor, speed of traction motor, gear ratio and operating efficiency of traction motor. Further, the main controller unit (102) is configured to determine operating efficiency required by the traction motor (10) in relation to a corresponding torque and speed required by the traction motor (10) and a drive axle of the vehicle based on the at least one lookup table (T1) if the actual operating efficiency of the traction motor (10TM) is less than the operating efficiency required by the traction motor (10TM). Further, the main controller unit (102) is configured to change a speed and torque of the power transmission unit (10PTU) based on the operating efficiency required by the traction motor (10TM). The main controller unit (102) is configured to operate the traction motor (10TM) at required torque and speed by varying frequency and electric current supply to the traction motor (10TM) based on the operating efficiency required by the traction motor (10TM).

| | Axle speed, rpm | Axle torque, Nm | Gear ratio | Motor speed, rpm | Motor torque, Nm | Efficiency |
|---|---|---|---|---|---|---|
| Case 1 | 1000 | 500 | 5 | 5000 | 100 | 90% |
| | 1000 | 500 | 4.5 | 4500 | 111.11 | 90% |
| | 1000 | 500 | 4 | 4000 | 125 | 91% |
| | 1000 | 500 | 3.5 | 3500 | 142.86 | 92% |
| | 1000 | 500 | 3 | 3000 | 166.67 | 92% |
| | 1000 | 500 | 2.5 | 2500 | 200 | 94% |
| | 1000 | 500 | 2 | 2000 | 250.00 | 94% |
| | 1000 | 500 | 1.5 | 1500 | 333.33 | 92% |
| | 1000 | 500 | 1 | 1000 | 500.00 | 90% |

Lookup table (T1) indicates torque of drive axle, speed of drive axle, torque of traction motor, speed of traction motor, gear ratio and operating efficiency of traction motor.

For example, the actual speed and torque of the traction motor (10TM) is 5000 rpm and 100 Nm respectively. The main controller unit (102) calculates that the actual power of the traction motor (10TM) is 50 kW corresponding to 5000 rpm and 100 Nm. From the lookup table (T1), the main controller unit (102) determines that the actual operating efficiency of the traction motor (10TM) is 90% corresponding to 5000 rpm and 100 Nm. Based on the lookup table (T1), the main controller unit (102) selects 2500 rpm and 200 Nm as torque and speed respectively required by the traction motor (10TM) and the corresponding operating efficiency of the traction motor (10TM) is 94% which is 4% higher than the 90% actual operating efficiency of the traction motor (10TM). For 2500 rpm and 200 Nm, the power required by the traction motor (10TM) is 50 kW which is equal to 50 kW actual power of the traction motor (10TM). Thus, the traction motor (10TM) can deliver same power (50 kW) at higher operating efficiency (94%). To achieve 94% operating efficiency for the traction motor (10TM), the main controller unit (102) operates the traction motor (10TM) at 2500 rpm and 200 Nm.

In another example, the actual speed and torque of the traction motor (10TM) is 1000 rpm and 500 Nm respectively. The main controller unit (102) calculates that the actual power of the traction motor (10TM) is 50 kW corresponding to 1000 rpm and 500 Nm. From the lookup table (T1), the main controller unit (102) determines that the actual operating efficiency of the traction motor (10TM) is 90% corresponding to 1000 rpm and 500 Nm. Based on the lookup table (T1), the main controller unit (102) selects 2000 rpm and 250 Nm as torque and speed respectively required by the traction motor (10TM) and the corresponding operating efficiency of the traction motor (10TM) is 94% which is 4% higher than the 90% actual operating efficiency of the traction motor (10TM). For 2000 rpm and 250 Nm, the power required by the traction motor (10TM) is 50 kW which is equal to 50 kW actual power of the traction motor (10TM). Thus, the traction motor (10TM) can deliver the same power (50 kW) at higher operating efficiency (94%). To achieve 94% operating efficiency for the traction motor (10TM), the main controller unit (102) operates the traction motor (10TM) at 2000 rpm and 250 Nm.

Now, consider that the actual speed and torque of the traction motor (10TM) is 2500 rpm and 200 Nm. The main controller unit (102) calculates that the actual power of the traction motor (10TM) is 50 kW corresponding to 2500 rpm and 200 Nm. From the lookup table (T1), the main controller unit (102) determines that the actual operating efficiency of the traction motor (10TM) is 94% corresponding to 2000 rpm and 200 Nm. Based on the lookup table (T1), the main controller unit (102) determines that the actual operating efficiency ($^{94}$%) of the traction motor (10TM) is the higher operating efficiency. Thus, the main controller unit (102) does not interfere in changing the speed and torque of the traction motor (10TM) and the power transmission unit (10PTU).

In an embodiment, the main controller unit (102) is configured to change the speed and torque of the power transmission unit (10PTU) by changing a gear ratio of the power transmission unit (10PTU) based on the operating efficiency required by the traction motor (10TM). In another embodiment, the main controller unit (102) is configured to generate and send a gear ratio change command to a transmission controller unit (10TCU) based on the operating efficiency required by the traction motor (10TM). Further, the transmission controller unit (10TCU) is configured to execute a change in gear ratio of the power transmission unit (10PTU) thereby changing the speed and torque of the power transmission unit (10PTU) based on the gear ratio change command sent by the main controller unit (102) to the transmission controller unit (10TCU).

In another embodiment, the main controller unit (102) is configured to change speed and torque of the power transmission unit (10PTU) based on the operating efficiency required by the traction motor (10TM) by calculating shaft travel required by an actuator which enables changing the gear ratio if the power transmission unit (10PTU) is a hydro-static transmission unit; and generating and sending a shaft travel command to the actuator for moving a shaft of the actuator by the required shaft travel thereby changing the gear ratio (speed and torque) of the power transmission unit (10PTU), hydro-static transmission unit. In another embodiment, the main controller unit (102) is configured to change speed and torque of the power transmission unit (10PTU) by at least one of actuating or de-actuating clutches or actuators which enables changing gear ratio if the power transmission unit (10PTU) is an automatic power transmission unit having planetary geartrains.

The control switch (108) is provided in communication with the main controller unit (102). The control switch (108) is switched ON or switched OFF manually by an operator (driver) of the vehicle to enable or disable the control of the powertrain (10) by the main controller unit (102). The control switch (108) is located on a vehicular structure such as but not limited to a dashboard of the vehicle. In another embodiment, the operator can press an icon, or any other graphic feature displayed in a display unit or instrument cluster for enabling or disabling the control of the powertrain (10) by the main controller unit (102). It is also within the scope of the invention to provide buttons, knobs or levers or any other hand operated controls or voice commands for enabling or disabling the control of the powertrain (10) by the main controller unit (102).

Figure 2:
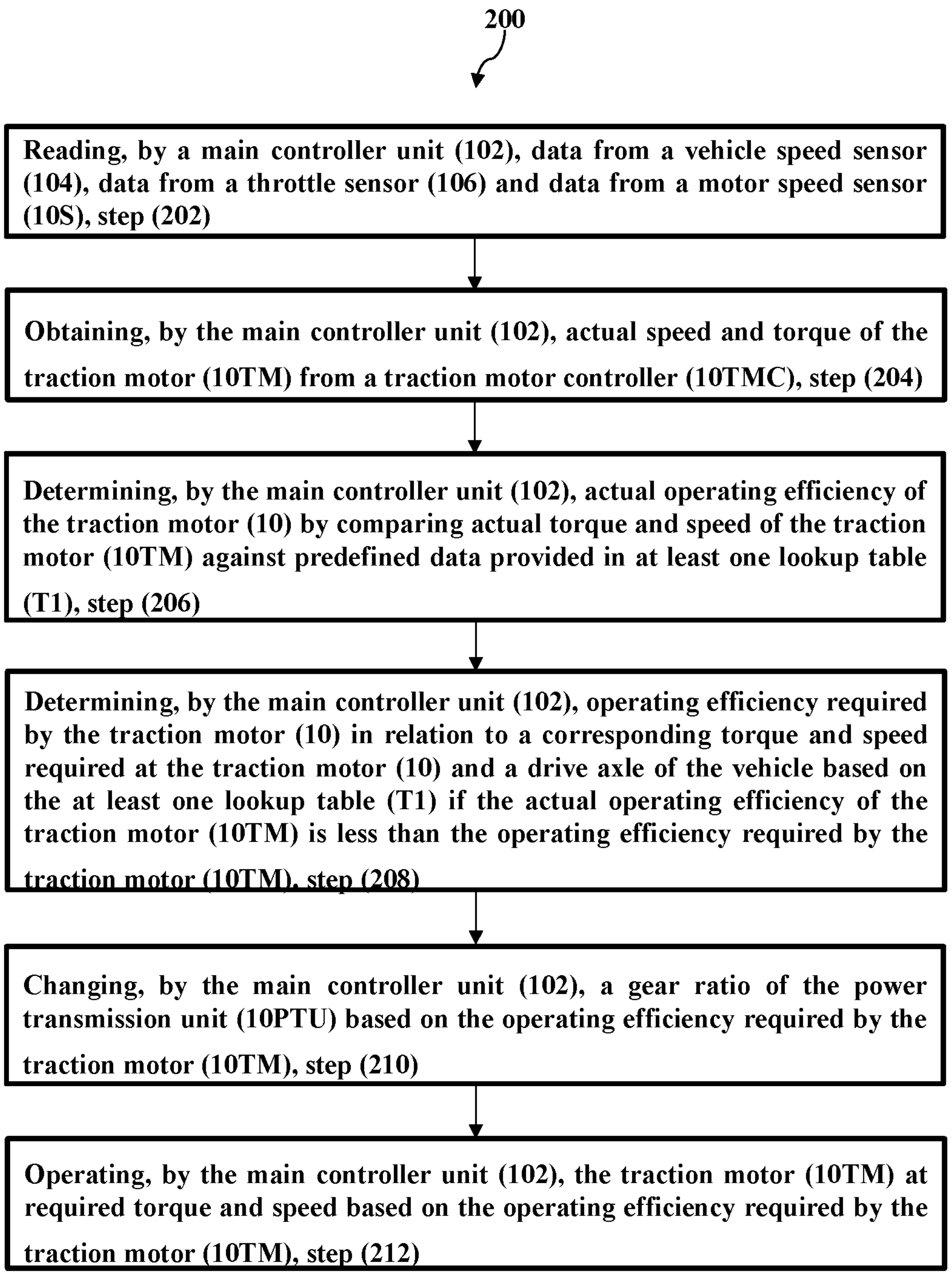
FIG. 2 depicts a flowchart indicating steps of a method for controlling the powertrain for reducing power loss of the traction motor in the vehicle.

FIG. 2 depicts a flowchart indicating steps of a method (200) for controlling the powertrain for reducing power loss of the traction motor (10TM) in the vehicle. For the purpose of this description and ease of understanding, the method (200) is explained herein with below reference to controlling the powertrain (10) having a hydro-static transmission unit for reducing power loss of the traction motor (10TM) in an electric vehicle. However, it is also within the scope of the invention to practice/implement the entire steps of the method (200) in a same manner or in a different manner or with omission of at least one step to the method (200) or with any addition of at least one step to the method (200) for controlling the powertrain (10) having any other continuously variable transmission (CVT) or any other infinitely variable transmission (IVT) or any other automatic power transmission unit present in any other agricultural machines or any other off-road vehicles or hybrid vehicles or any other vehicles or industrial machines, where reducing power loss of traction motor or drive motor or propulsion motor is required. At step (202), the method (200) includes, reading, by a main controller unit (102), data from a vehicle speed sensor (104), data from a throttle sensor (106) and data from a motor speed sensor (10S). At step (204), the method (200) includes, obtaining, by the main controller unit (102), actual speed and torque of the traction motor (10TM) from a traction motor controller (10TMC). At step (206), the method (200) includes, determining, by the main controller unit (102), actual operating efficiency of the traction motor (10TM) by comparing actual torque and speed of the traction motor (10TM) against predefined data provided in at least one lookup table (T1). At step (208), the method (200) includes, determining, by the main controller unit (102), operating efficiency required by the traction motor (10TM) in relation to a corresponding torque and speed required by the traction motor (10TM) and a drive axle of the vehicle based on the at least one lookup table (T1) if the actual operating efficiency of the traction motor (10TM) is less than the operating efficiency required by the traction motor (10TM). At step (210), the method (200) includes, changing, by the main controller unit (102), a speed and torque of the power transmission unit (10PTU) based on the operating efficiency required by the traction motor (10TM). At step (212), the method (200) includes, operating, by the main controller unit (102), the traction motor (10TM) at required torque and speed based on the operating efficiency required by the traction motor (10TM).

Further, the method step (210) includes changing, by the main controller unit (102), a gear ratio of the power transmission unit (10PTU) based on the operating efficiency required by the traction motor (10TM).

Furthermore, the method step (210) includes calculating, by the main controller unit (102), shaft travel required by an actuator if the power transmission unit (10PTU) is a hydro-static transmission unit; and generating and sending, by the main controller unit (102), a shaft travel command to the actuator for moving a shaft of the actuator at the required shaft travel thereby changing the gear ratio (speed and torque) of the power transmission unit (10PTU).

Further, the method step (210) includes generating and sending a gear ratio change command to a transmission controller unit (10TCU) based on the operating efficiency required by the traction motor (10TM); and executing, by the transmission controller unit (10TCU), a change in gear ratio of the power transmission unit (10PTU) thereby changing the speed and torque of the power transmission unit (10PTU) based on the gear ratio change command sent by the main controller unit (102) to the transmission controller unit (10TCU).

Further, the method step (212) includes varying, by the main controller unit (102), frequency and electric current supply to the traction motor (10TM) based on the operating efficiency required by the traction motor (10TM).

The technical advantages of the system (100) are as follows. The system optimizes the operating zone of the traction motor for achieving better efficiency of the traction motor. The system reduces power consumption required for cooling battery and powertrain components of the vehicle due to less heat generation achieved by operating the traction motor in higher efficiency zone. The system varies hydro-static transmission (HST) ratio to operate the traction motor in higher efficiency zone as well as increases vehicle range. The system minimizes power consumed by the traction motor thereby increasing the vehicle range and thermal performance.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modifications within the spirit and scope of the embodiments as described herein.

We claim:

1. A system (100) for controlling a powertrain (10) for reducing power loss of a traction motor (10TM) in a vehicle, the system (100) comprising:

a main controller unit (102) configured to:

read data from a vehicle speed sensor (104), data from a throttle sensor (106) and data from a motor speed sensor (10S);

obtain actual speed and torque of the traction motor (10TM) from a traction motor controller (10TMC);

determine an actual operating efficiency of the traction motor (10TM) by comparing actual torque and speed of the traction motor (10TM) against predefined data provided in at least one lookup table (T1), wherein the predefined data provided in the lookup table (T1) includes torque of drive axle, speed of drive axle, torque of traction motor (10TM), speed of traction motor (10TM), gear ratio and operating efficiency of traction motor (10TM);

determine a required operating efficiency of the traction motor (10TM) in relation to a corresponding torque and speed required by the traction motor (10TM) and a corresponding torque and speed required by a drive axle of the vehicle based on the at least one lookup table (T1);

compare the actual operating efficiency with the required operating efficiency;

change a speed and torque of a power transmission unit (10PTU), by at least indirectly changing a gear ratio of the power transmission unit (10PTU) based on the required operating efficiency, if the actual operating efficiency of the traction motor (10TM) is less than the required operating efficiency; and operate the traction motor (10TM) at required torque and speed based on the operating efficiency required by the traction motor (10TM).

2. The system (100) as claimed in claim 1, wherein the main controller unit (102) is configured to operate the traction motor (10TM) at required torque and speed by varying frequency and electric current supply to the traction motor (10TM) based on the operating efficiency required by the traction motor (10TM).

3. The system (100) as claimed in claim 1, wherein the main controller unit (102) is configured to change the speed and torque of the power transmission unit (10PTU) by changing the gear ratio of the power transmission unit (10PTU) based on the operating efficiency required by the traction motor (10TM).

4. The system (100) as claimed in claim 1, wherein the main controller unit (102) is configured to change the speed and torque of the power transmission unit (10PTU) by generating and sending a gear ratio change command to a transmission controller unit (10TCU) based on the operating efficiency required by the traction motor (10TM); and the transmission controller unit (10TCU) is configured to execute a change in gear ratio of the power transmission unit (10PTU) thereby changing the speed and torque of the power transmission unit (10PTU) based on the gear ratio change command sent by the main controller unit (102) to the transmission controller unit (10TCU).

5. The system (100) as claimed in claim 1, wherein the main controller unit (102) is configured to change speed and torque of the power transmission unit (10PTU) based on the operating efficiency required by the traction motor (10TM) by, calculating shaft travel required by an actuator if the power transmission unit (10PTU) is a hydro-static transmission unit; and generating and sending a shaft travel command to the actuator for moving a shaft of the actuator by the required shaft travel thereby changing the gear ratio (speed and torque) of the power transmission unit (10PTU).

6. The system (100) as claimed in claim 1, wherein the lookup table (T1) is stored in a memory unit of the main controller unit (102).

7. A method (200) for controlling a powertrain (10) for reducing power loss of a traction motor (10TM) in a vehicle, the method (200) comprising:

reading, by a main controller unit (102), data from a vehicle speed sensor (104), data from a throttle sensor (106) and data from a motor speed sensor (10S);

obtaining, by the main controller unit (102), actual speed and torque of the traction motor (10TM) from a traction motor controller (10TMC);

determining, by the main controller unit (102), an actual operating efficiency of the traction motor (10TM) by comparing actual torque and speed of the traction motor (10TM) against predefined data provided in at least one lookup table (T1), wherein the predefined data provided in the lookup table (T1) includes torque of drive axle, speed of drive axle, torque of traction motor, speed of traction motor, gear ratio and operating efficiency of traction motor;

determining, by the main controller unit (102), a required operating efficiency of the traction motor (10TM) in relation to a corresponding torque and speed required by the traction motor (10TM) and a corresponding torque and speed required by a drive axle of the vehicle based on the at least one lookup table (T1);

comparing, by the main controller unit (102), the actual operating efficiency with the required operating efficiency;

changing, by the main controller unit (102), a speed and torque of the power transmission unit (10PTU) by at least indirectly changing a gear ratio of the power transmission unit (10PTU) based on the required operating efficiency, if the actual operating efficiency of the traction motor (10TM) is less than the required operating efficiency; and operating, by the main controller unit (102), the traction motor (10TM) at required torque and speed based on the operating efficiency required by the traction motor (10TM).

8. The method (200) as claimed in claim 7, wherein operating, by the main controller unit (102), the traction motor (10TM) at required torque and speed based on the operating efficiency required by the traction motor (10TM) includes, varying, by the main controller unit (102), frequency and electric current supply to the traction motor (10TM) based on the operating efficiency required by the traction motor (10TM), wherein the lookup table (T1) is stored in a memory unit of the main controller unit (102).

9. The method (200) as claimed in claim 8, wherein changing, by the main controller unit (102), the speed and torque of the power transmission unit (10PTU) based on the operating efficiency required by the traction motor (10TM) includes, changing, by the main controller unit (102), the gear ratio of the power transmission unit (10PTU) based on the operating efficiency required by the traction motor (10TM).

10. The method (200) as claimed in claim 8, wherein changing, by the main controller unit (102), the speed and torque of the power transmission unit (10PTU) based on the operating efficiency required by the traction motor (10TM) includes, calculating, by the main controller unit (102), shaft travel required by an actuator if the power transmission unit (10PTU) is a hydro-static transmission unit; and generating and sending, by the main controller unit (102), a shaft travel command to the actuator for moving a shaft of the actuator at the required shaft travel thereby changing the gear ratio (speed and torque) of the power transmission unit (10PTU).

* * * * *